(12) United States Patent
Schoenenborn

(10) Patent No.: US 10,508,661 B2
(45) Date of Patent: Dec. 17, 2019

(54) GAS TURBINE COMPRESSOR

(71) Applicant: MTU Aero Engines AG, Munich (DE)

(72) Inventor: Harald Schoenenborn, Karlsfeld (DE)

(73) Assignee: MTU Aero Engines AG, Munich (DE)

( * ) Notice: Subject to any disclaimer, the term of this patent is extended or adjusted under 35 U.S.C. 154(b) by 210 days.

(21) Appl. No.: 15/367,537

(22) Filed: Dec. 2, 2016

(65) Prior Publication Data

US 2017/0159676 A1 Jun. 8, 2017

(30) Foreign Application Priority Data

Dec. 4, 2015 (EP) ..................................... 15198098

(51) Int. Cl.
```
F04D 29/66    (2006.01)
F04D 29/54    (2006.01)
F01D 5/16     (2006.01)
```

(52) U.S. Cl.
CPC .............. F04D 29/666 (2013.01); F01D 5/16 (2013.01); F04D 29/541 (2013.01); F05D 2260/96 (2013.01); Y02T 50/673 (2013.01)

(58) Field of Classification Search
CPC ........ F04D 29/666; F04D 29/541; F01D 5/16; F05D 2260/96; Y02T 50/673
USPC ...................................................... 415/199.5
See application file for complete search history.

(56) References Cited

U.S. PATENT DOCUMENTS

| | | | |
|---|---|---|---|
| 4,097,192 A * | 6/1978 | Kulina | F01D 5/14 416/175 |
| 5,667,361 A * | 9/1997 | Yaeger | F01D 5/22 416/193 R |
| 6,428,278 B1 * | 8/2002 | Montgomery | F01D 5/10 416/203 |
| 7,367,775 B2 | 5/2008 | Borufka et al. | |
| 2005/0249586 A1 | 11/2005 | Dupeux et al. | |
| 2010/0247310 A1 | 9/2010 | Kelly | |

(Continued)

FOREIGN PATENT DOCUMENTS

| | | |
|---|---|---|
| DE | 10326533 | 1/2005 |
| EP | 0921275 | 6/1999 |

(Continued)

OTHER PUBLICATIONS

Castanier et al:"Next-Generation modeling, analysis, and testing of the vibration of mistuned bladed disks," University of Michigan, AFOSR, Dec. 21, 2007, 27 pages.

*Primary Examiner* — Jason D Shanske
*Assistant Examiner* — Sang K Kim
(74) *Attorney, Agent, or Firm* — Davidson, Davidson & Kappel, LLC

(57) ABSTRACT

A compressor for a gas turbine, in particular of an aircraft engine, having a plurality of arrays (10-25) of flow-directing elements that are serially disposed in a through flow direction from a compressor inlet to a compressor outlet (1, 2); at least one upstream, mistuned array (20) of flow-directing elements and at least one downstream, mistuned array (22) of flow-directing elements each having at least two types of flow-directing elements that differ structurally from one another; and at least 80%, in particular at least 95% of the rotor blades (45) of a furthest downstream rotor blade array (25) that, in the through flow direction, is configured downstream of the downstream, mistuned array (22) of flow-directing elements, being mutually identically constructed.

16 Claims, 2 Drawing Sheets

(56) References Cited

U.S. PATENT DOCUMENTS

| | | | |
|---|---|---|---|
| 2013/0170947 A1* | 7/2013 | Kurt-Elli | ............... G01H 1/006 415/1 |
| 2015/0110604 A1 | 4/2015 | Calza et al. | |
| 2015/0139789 A1 | 5/2015 | Schoenenborn | |

FOREIGN PATENT DOCUMENTS

| | | | | |
|---|---|---|---|---|
| EP | 1 211 382 A2 | 6/2002 | | |
| EP | 2 860 347 A1 | 4/2015 | | |
| WO | WO2006/084438 | 8/2006 | | |
| WO | WO2014/130332 | 8/2014 | | |
| WO | WO 2014130332 A1 * | 8/2014 | ............. | F01D 5/143 |

* cited by examiner

GAS TURBINE COMPRESSOR

This claims the benefit of European Patent Application EP15198098.4, filed Dec. 4, 2015 and hereby incorporated by reference herein.

The present invention relates to a compressor for a gas turbine, in particular of an aircraft engine having at least one such compressor.

BACKGROUND

The European Patent Application EP 2 860 347 A1 describes an aerodynamically and structurally mistuned array of flow-directing elements for a compressor of a gas turbine that has first flow-directing elements and, differing therefrom, second flow-directing elements for reducing a fluttering in the event of a pumping of the compressor.

SUMMARY OF THE INVENTION

It is an object of an embodiment of the present invention to improve a gas turbine.

In accordance with an embodiment of the present invention, a compressor for a gas turbine, in particular of an aircraft engine, in particular one or a plurality of compressors of a gas turbine, in particular of an aircraft engine, (each) has/have a plurality of arrays of flow-directing elements that are serially disposed in the through flow direction; at least one stator vane array or rotor blade array, which is disposed further upstream in the through flow direction, having two or more types of flow-directing elements that differ structurally from one another and, without limiting universality, being, therefore, referred to in the following as the upstream or leading, mistuned array of flow-directing elements; and at least one stator vane array or rotor blade array, which is disposed further downstream in the through flow direction, likewise having two more types of flow-directing elements that differ structurally from one another, and, without limiting universality, being, therefore, referred to in the following as the downstream or trailing, mistuned array of flow-directing elements. Accordingly, in an embodiment, the upstream mistuned array of flow-directing elements may be a stator vane array having two or more stator vane types that differ structurally from one another or a rotor blade array having two or more rotor blade types that differ structurally from one another. In an embodiment, the downstream mistuned array of flow-directing elements may be a stator vane array having two or more stator vane types that differ structurally from one another or a rotor blade array having two or more rotor blade types that differ structurally from one another.

In an embodiment of the present invention, at least 80%, in particular at least 85%, in particular at least 95%, in particular all up to at most five, in particular all up to at most three, in particular all rotor blades of a downstream, respectively most trailing, respectively last rotor blade array of the compressor that, in the through flow direction, is configured downstream of the downstream mistuned array of flow-directing elements, are mutually identically constructed.

Surprisingly, it has been found that, by combining at least two mistuned arrays of flow-directing elements, in particular an upstream and a downstream mistuned rotor blade array, an upstream and a downstream, mistuned stator vane array, an upstream, mistuned rotor blade array and a downstream, mistuned stator vane array, or an upstream, mistuned stator vane array and a downstream, mistuned rotor blade array, each having at least two different types of flow-directing elements having a most downstream, respectively most trailing, respectively last rotor blade array which has been mistuned in such a way, at most, to a limited extent, preferably not very mistuned, in particular essentially has not been mistuned, it is possible to very advantageously reduce a fluttering of these and/or of other arrays of flow-directing elements of the compressor in the event of a pumping. In this regard, it is assumed that the two mistuned arrays of flow-directing elements interact aerodynamically and/or structurally, and that this interaction is advantageously influenced by the subsequent, furthest downstream rotor blade array that is mistuned, at most to a limited extent.

In an embodiment, the, respectively one compressor is a furthest upstream, respectively low-pressure compressor. In an embodiment, the, respectively one compressor is a furthest downstream, respectively high-pressure compressor. Similarly, the, respectively one compressor may be an intermediate-pressure compressor configured between a low- and high-pressure compressor.

The through flow direction is (oriented) from a compressor inlet to a compressor outlet, so that a furthest upstream rotor blade array, respectively stator vane array is a rotor blade array, respectively stator vane array that is most proximate to a compressor inlet; correspondingly, a furthest downstream rotor blade array, respectively stator vane array is a rotor blade array, respectively stator vane array that is most proximate to the compressor outlet. In other words, the through flow direction is a usual, respectively normal through flow direction against which the gas may flow temporarily in the event of a pumping.

One embodiment provides that the upstream, mistuned array of flow-directing elements and the downstream, mistuned array of flow-directing elements be immediately proximate, respectively successive in the through flow direction.

Surprisingly, it has been found that, by configuring one or a plurality of pairs of adjacent, upstream and downstream, mistuned arrays of flow-directing elements, it is advantageously possible to reduce a fluttering of the same and/or of other arrays of flow-directing elements of the compressor in the event of a pumping.

Another embodiment provides that exactly one or a plurality of stator vane arrays and/or exactly one or a plurality of rotor blade arrays be configured between the upstream, mistuned array of flow-directing elements and the downstream, mistuned array of flow-directing elements. Of these flow-directing elements, in each case, at least 80%, in particular at least 85%, in particular at least 95%, in particular all up to at most five, in particular all up to at most three, in particular all are identically constructed among themselves or within the particular array of flow-directing elements.

Surprisingly, it has been found that, by configuring exactly one or a plurality of rotor blade arrays and/or stator vane arrays which, at most, have been mistuned to a limited extent, preferably not very mistuned, in particular have not been mistuned, between the upstream and downstream, mistuned arrays of flow-directing elements, it is very advantageously possible in each case to reduce a fluttering thereof and/or of other arrays of flow-directing elements of the compressor in the event of a pumping.

Additionally or alternatively, configured between the upstream and downstream, mistuned arrays of flow-directing elements are one or a plurality of mistuned stator vane arrays or rotor blade arrays which, in one embodiment, each have two or more types of flow-directing elements that differ structurally from one another and, without limiting universality, are, therefore, referred to in the following as further mistuned arrays of flow-directing elements.

Surprisingly, it has been found that, by configuring one or a plurality of further mistuned rotor blade arrays and/or stator vane arrays between the upstream and downstream, mistuned arrays of flow-directing elements, it is possible to very advantageously reduce a fluttering of these and/or of other arrays of flow-directing elements of the compressor in the event of a pumping.

In particular, the, respectively a compressor may, therefore, have a sequence of {(upstream) mistuned stator vane arrays and/or rotor blade arrays having at least two types of flow-directing elements—stator vane arrays or rotor blade arrays, which are mistuned at most to a limited extent, having at least 80% identically constructed flow-directing elements—(downstream) mistuned stator vane arrays or rotor blade arrays having at least two types of flow-directing elements} or {(upstream) mistuned stator vane arrays or rotor blade arrays having at least two types of flow-directing elements—(further) mistuned stator vane arrays or rotor blade arrays having at least two types of flow-directing elements—(downstream) mistuned stator vane arrays or rotor blade arrays having at least two types of flow-directing elements}; in each case, the furthest downstream rotor blade array having at least 80% of identically constructed flow-directing elements.

In an embodiment, the upstream, mistuned array of flow-directing elements is a furthest upstream, respectively most leading, respectively first stator vane array or rotor blade array of the compressor.

In particular, this may hereby very advantageously reduce a fluttering of this and/or of other arrays of flow-directing elements of the compressor during a normal through flow.

An embodiment provides that exactly one or a plurality of stator vane arrays and/or exactly one or a plurality of rotor blade arrays be configured between the downstream, mistuned array of flow-directing elements and the downstream, rotor blade array. Of these flow-directing elements, in each case, at least 80%, in particular at least 85%, in particular at least 95%, in particular all up to at most five, in particular all up to at most three, in particular all are identically constructed among themselves or within the particular array of flow-directing elements.

Additionally or alternatively, one embodiment provides that exactly one or a plurality of mistuned stator vane arrays and/or exactly one or a plurality of mistuned rotor blade arrays, which each have two or more types of flow-directing elements that differ structurally from one another, be configured between the downstream, mistuned array of flow-directing elements and the most downstream rotor blade array.

Surprisingly, it has been found that this may hereby advantageously reduce a fluttering of the same and/or of other arrays of flow-directing elements of the compressor, in each case individually and, in particular, in combination, in the event of a pumping.

In one embodiment, of the flow-directing elements of one or of a plurality of mistuned arrays of flow-directing elements, in particular of the upstream, mistuned (rotor blade or stator vane) array of flow-directing elements, of the downstream, mistuned (rotor blade or stator vane) array of flow-directing elements, of one or of a plurality of (further) mistuned rotor blade or stator vane arrays configured therebetween and/or of one or of a plurality of the mistuned rotor blade or stator vane arrays of flow-directing elements configured between the downstream, mistuned (rotor blade or stator vane) array of flow-directing elements and the furthest downstream rotor blade array, in each case, at least 5%, in particular at least 10%, in particular at least 25%, in particular at least two, in particular at least five, of one type of flow-directing element and at least 5%, in particular at least 10%, in particular at least 25%, in particular at least two, in particular at least five are of a type of flow-directing element that differs structurally therefrom.

Surprisingly, it has been found that such a mistuning may hereby very advantageously reduce a fluttering of the same and/or of other arrays of flow-directing elements of the compressor, in the event of a pumping.

In an embodiment, two or more types of flow-directing elements that differ structurally from one another may have, in particular different natural frequencies or eigenmodes, in particular different first and/or higher natural bending frequencies and/or torsional natural frequencies or torsional eigenmodes, in particular of the airfoil. Additionally or alternatively, one embodiment provides that two or more types of flow-directing elements that differ structurally from one another may, in particular have different fillet and/or shroud geometries. One embodiment provides that two or more types of flow-directing elements that differ structurally from one another may generally have different structural designs, respectively the array of flow-directing elements having these types of flow-directing elements that differ structurally from one another may, in particular, be structurally mistuned.

Additionally or alternatively, one embodiment provides that two or more types of flow-directing elements that differ structurally from one another may, in particular, feature different airfoil profiles, in particular different leading edges (shapes) and/or different trailing edges (shapes) and/or different profile sections (at the same radial height(s)). In one embodiment, two or more types of flow-directing elements that differ structurally from one another may generally have different aerodynamic designs, respectively the array of flow-directing elements having these structurally different types of flow-directing elements may, in particular, be aerodynamically mistuned.

Two or more types of flow-directing elements of a mistuned array of flow-directing elements that differ structurally from one another and two or more types of flow-directing elements of another mistuned array of flow-directing elements that differ structurally from one another may, in particular, all differ structurally from one another. In other words, different mistuned arrays of flow-directing elements may each have at least two types of flow-directing elements that are specific to arrays of flow-directing elements and that differ structurally from one another.

The present disclosure also expressly makes reference to the EP 2 860 347 A1 mentioned at the outset, as well as to the EP 1 211 382 A2 and the U.S. 2010/0247310 A1 mentioned therein, and to the contents thereof.

Along the lines of the present invention, two flow-directing elements are identically constructed, provided that they are identical within the scope of the manufacturing tolerance, respectively testing tolerance, respectively correspond to one another in geometry and mass distribution.

BRIEF DESCRIPTION OF THE DRAWINGS

Other advantageous embodiments of the present invention will become apparent from the dependent claims and the following description of preferred embodiments. To this end, in partially schematic form, the only

DETAILED DESCRIPTION

Figure 1:
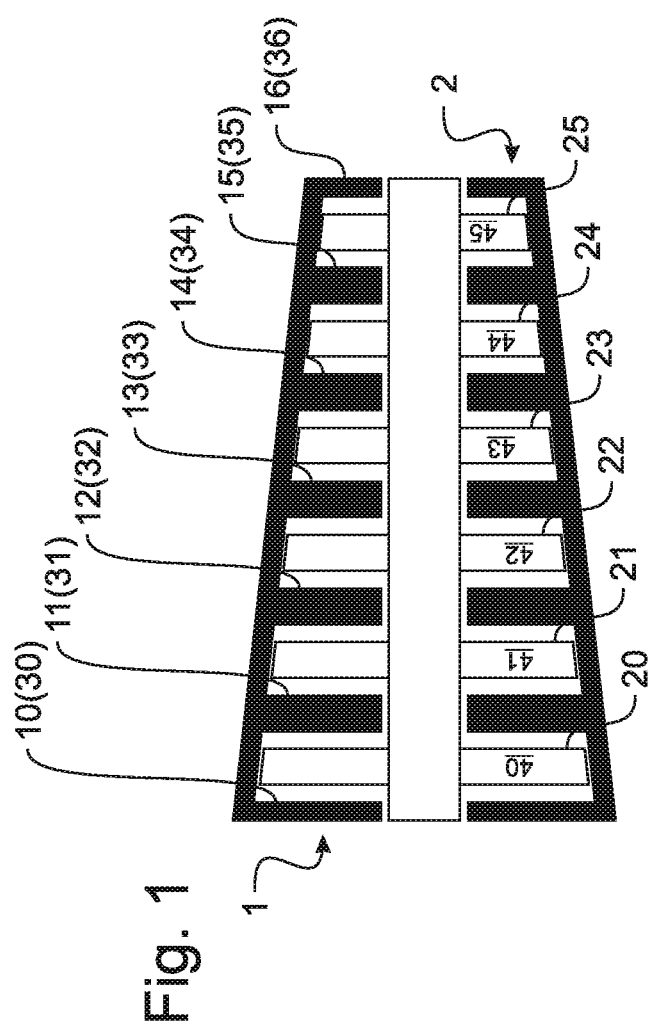
FIG. 1 shows a compressor of a gas turbine in accordance with an embodiment of the present invention.

FIG. 1 shows a compressor of a gas turbine in accordance with one embodiment of the present invention including a compressor inlet 1 and a compressor outlet 2. A through flow direction is oriented from compressor inlet 1 to compressor outlet 2 (from left to right in FIG. 1).

Configured in this through flow direction are a plurality of housing-fixed stator vane arrays 10-16 having stator vanes 30-36 that are shown in black in FIG. 1.

Configured between each pair of stator vane arrays is a rotor blade array; in FIG. 1, the rotor blade array being illustrated in white and numbered 20-25; the rotor blades thereof correspondingly by 40-45.

The furthest downstream rotor blade array 25 (at the far right in FIG. 1) is not mistuned and exclusively has mutually identically constructed rotor blades 45.

Figure 2:
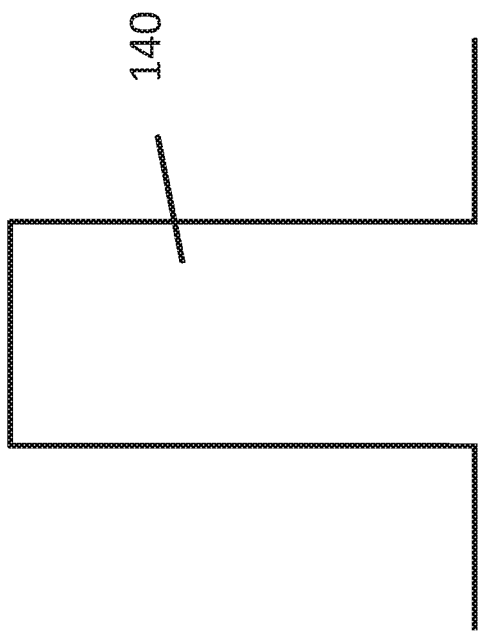
FIG. 2 shows schematically two blade types, one blade type being mistuned.
Figure 2:
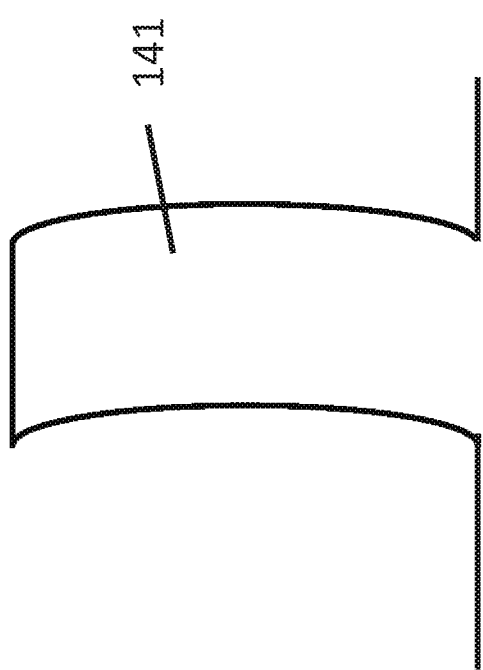

The furthest upstream rotor blade array 20 (at the far left in FIG. 1) is mistuned; at least 10% of rotor blades 40 thereof are of one rotor blade type 140 (shown schematically in FIG. 2) and at least 10% of a rotor blade type 141 (FIG. 2 shown schematically) that differs herefrom. Thus, a further (furthest) upstream, mistuned rotor blade array is formed.

At least one rotor blade array 21, 22, 23 and/or 24 configured between this upstream, mistuned rotor blade array 20 and rotor blade array 25, that is not mistuned, in the exemplary embodiment, rotor blade array 22, is likewise mistuned; of rotor blades 42 thereof, (in each case) at least 10% are of one rotor blade type and at least 10% of a rotor blade type that differs herefrom, thus a downstream, mistuned rotor blade array is formed.

In this context, one or a plurality of other rotor blade arrays and/or, in a modification, also furthest upstream rotor blade array 20 may also not be mistuned and exclusively feature rotor blades that are identically constructed among themselves, respectively within the particular rotor blade array.

In the exemplary embodiment, rotor blade array 23 configured between downstream, mistuned rotor blade array 22 and furthest downstream rotor blade array 25 is likewise mistuned; however, rotor blade array 24 between downstream, mistuned rotor blade array 22 and furthest downstream rotor blade array 25, as well as rotor blade array 21 between upstream, mistuned rotor blade array 20 and downstream, mistuned rotor blade array 22 are not mistuned.

In one embodiment, one or a plurality of stator vane arrays 10-16 are likewise mistuned; in each case, at least 10% of the rotor blades of the corresponding rotor blade array being of a (stator vane-specific first) stator vane type, and at least 10% of a (stator vane-specific second) stator vane type that differs herefrom. Additionally or alternatively, in one embodiment, one or a plurality of stator vane arrays 10-16 are not mistuned, and/or each feature stator vanes that are identically constructed among themselves or within the particular stator vane array.

Although exemplary embodiments are explained in the preceding description, it should be noted that numerous modifications are possible. It should also be appreciated that the exemplary embodiments are merely examples and are in no way intended to restrict the scope of protection, the uses, or the design. Rather, the preceding description provides one skilled in the art with a guideline for realizing at least one exemplary design, it being possible for various modifications to be made, particularly with regard to the function and configuration of the described components, without departing from the scope of protection as is derived from the claims and the combinations of features equivalent thereto.

LIST OF REFERENCE NUMERALS

1 compressor inlet
2 compressor outlet
10-16 stator vane array
20-25 rotor blade array
30-36 stator vane
40-45 rotor blade

What is claimed is:

1. A compressor for a gas turbine, the compressor comprising:
   a plurality of arrays of flow-directing elements serially disposed in a through flow direction from a compressor inlet to a compressor outlet;
   the plurality of arrays including at least one upstream mistuned array of flow-directing elements and at least one downstream mistuned array of flow-directing elements each having at least two types of flow-directing elements differing structurally from one another, and
   all of the rotor blades of a furthest downstream rotor blade array, in the through flow direction, and downstream of the downstream mistuned array of flow-directing elements, being mutually identically constructed.

2. The compressor as recited in claim 1 wherein the plurality of arrays includes at least one further array of flow-directing elements having flow-directing elements at least 80% being mutually identically constructed and being configured between the upstream and downstream arrays of flow-directing elements.

3. The compressor as recited in claim 2 wherein the at least one further array of flow-directing elements has flow-directing elements at least 95% being mutually identically constructed.

4. The compressor as recited in claim 1 wherein the upstream array of flow-directing elements is a furthest upstream array of flow-directing elements of the compressor.

5. The compressor as recited in claim 1 wherein the plurality of arrays configured between the downstream array of flow-directing elements and the furthest downstream rotor blade array includes at least one further array of flow-directing elements with flow-directing elements at least 80% mutually identically constructed; or the further array has at least one mistuned array of flow-directing elements with at least two types of flow-directing elements that differ structurally from one another.

6. The compressor as recited in claim 5 wherein the further array of flow-directing elements has flow-directing elements at least 95% mutually identically constructed.

7. The compressor as recited in claim 1 wherein, of the flow-directing elements of at least one of the mistuned upstream and downstream arrays of flow-directing elements, at least 5% are of one rotor blade type and at least 5% of a type of flow-directing element differs structurally from the one rotor blade type.

8. The compressor as recited in claim 1 wherein at least two types of flow-directing elements differing structurally from one another have different natural frequencies, fillet geometries or shroud geometries or airfoil profiles.

9. The compressor as recited in claim 8 wherein the two types of flow directing elements differing structurally from each other have different leading edges or trailing edges or profile sections.

10. A gas turbine comprising at least one compressor as recited in claim 1.

11. An aircraft engine comprising at least one compressor as recited in claim 1.

12. The compressor as recited in claim 1 wherein the at least one upstream mistuned array of flow-directing elements includes a furthest upstream mistuned rotor blade array.

13. The compressor as recited in claim 1 further comprising a further rotor blade array with all rotor blades identically constructed, the further rotor blade being between the at least one upstream mistuned array of flow directing elements and the at least one downstream mistuned array of flow-directing elements.

14. The compressor as recited in claim 1 wherein the plurality of arrays of flow-directing elements are rotor blade arrays and further comprising a plurality of stator vane arrays.

15. The compressor as recited in claim 14 wherein at least one of the stator vane arrays is a mistuned stator vane array.

16. The compressor as recited in claim 14 wherein at least one of the stator vane arrays has all stator vanes identically constructed.

\* \* \* \* \*